(12) United States Patent
VanEaton (10) Patent No.: US 10,896,397 B1
(45) Date of Patent: Jan. 19, 2021

(54) LOAD DATA COLLECTION AND DISPLAY METHOD

(71) Applicant: Robert VanEaton, Shreveport, LA (US)

(72) Inventor: Robert VanEaton, Shreveport, LA (US)

( * ) Notice: Subject to any disclaimer, the term of this patent is extended or adjusted under 35 U.S.C. 154(b) by 902 days.

(21) Appl. No.: 14/685,315

(22) Filed: Apr. 13, 2015

Related U.S. Application Data (60) Provisional application No. 61/978,283, filed on Apr. 11, 2014.

(51) Int. Cl.
*G06Q 10/08* (2012.01)
*G06F 16/44* (2019.01)

(52) U.S. Cl.
CPC ......... *G06Q 10/083* (2013.01); *G06F 16/444* (2019.01)

(58) Field of Classification Search
CPC .............. G06Q 10/083; G06F 16/444
USPC .......................................... 705/337
See application file for complete search history.

(56) References Cited

U.S. PATENT DOCUMENTS

| | | | | |
|---|---|---|---|---|
| 5,265,006 A | * | 11/1993 | Asthana | G06Q 10/06 705/7.22 |
| 2003/0078802 A1 | * | 4/2003 | Yonezawa | G06Q 10/047 705/338 |
| 2006/0265264 A1 | * | 11/2006 | Sanchez | G06Q 10/0631 705/7.26 |
| 2011/0238543 A1 | * | 9/2011 | Paez | G06Q 10/08 705/32 |
| 2012/0095935 A1 | * | 4/2012 | Mowat | G06Q 10/08 705/333 |
| 2012/0158608 A1 | * | 6/2012 | Arunapuram | G06Q 10/00 705/334 |
| 2012/0323622 A1 | * | 12/2012 | Scott | G06Q 10/06311 705/7.14 |
| 2013/0110739 A1 | * | 5/2013 | Hill | G06Q 10/083 705/333 |
| 2013/0159206 A1 | * | 6/2013 | Barahona | G06Q 50/28 705/338 |
| 2013/0339266 A1 | * | 12/2013 | Looman | G06Q 10/08355 705/338 |
| 2015/0006428 A1 | * | 1/2015 | Miller | G06Q 10/0835 705/336 |

FOREIGN PATENT DOCUMENTS

| | | | | |
|---|---|---|---|---|
| WO | WO-0199006 A2 | * | 12/2001 | G06Q 10/04 |

OTHER PUBLICATIONS

C.M. Meyer and H. Kopfer. Intelligent Decision Support: Current Challenger and Approaches ("Restrictions for the Operational Transportation Planning by Regulations on Drivers' Working Hours"). 2008. Gabler-Verlag. pp. 183-192. (Year: 2008).*

Kok, A.L. et al. Optimizing departure times in vehicle routes. (Oct. 30, 2010). Elsevier, European Journal of Operational Research 210 (2011) 579-587. (Year: 2010).*

\* cited by examiner

*Primary Examiner* — John P Go
*Assistant Examiner* — Hunter A Molnar
(74) *Attorney, Agent, or Firm* — Davis & Bujold PLLC; Charles G. Holoubek; Michael J. Bujold

(57) ABSTRACT

A method of displaying a network balance comprises the steps of determining an inbound truck capacity, determining an outbound load capacity, and subtracting the inbound truck capacity from the outbound load capacity to determine the network balance. The network balance is displayed on a computer screen or a computer printout.

20 Claims, 5 Drawing Sheets

LOAD DATA COLLECTION AND DISPLAY METHOD

PRIORITY

The present application claims the benefit of U.S. provisional patent application Ser. No. 61/978,283 filed Apr. 11, 2014.

BACKGROUND

Field of the Invention

The present invention relates to systems and methods for the computation and display of load balance for transportation shipping, and to shipment of goods based on optimal pick-up dates and times.

Description of Related Art

Carriers make load booking decisions based on their inbound truck capacity within a given date/time range and within a defined geographic area. It is necessary for a carrier to maintain balanced freight network within a date/time range within a geographic region, as an area out of balance in either inbound truck capacity or outbound load capacity is costly. Excess truck capacity creates driver cost of unused driver log book productivity, driver dissatisfaction of not working when the driver is available that can lead to the cost of driver turnover, truck cost of an unused asset, truck cost of the maintenance of the unused asset, and truck cost of repositioning an asset out of the geographic area. Excess load capacity creates customer dissatisfaction that can lead to the cost of losing a customer due to poor service, customer dissatisfaction that can lead to the cost of reduced or refunded revenue due to poor service, and truck cost of repositioning an asset into the geographic area.

The inventor has observed that an ability to communicate the balance needs, allowing the carrier's employees to make better, faster load booking decisions, is an important component of the carrier's success. Typically, this is a labor intensive process. A carrier discusses these capacity balance needs on a daily, a semi-daily, or an hourly basis. This is typically done by multiple operation managers within the carrier that determine the capacity balance needs of their geographic area of responsibility for the day or for the next day, by filling out a form and sending the form to the organization. Additionally, the individual load booking decisions are made when a load offer is made by the carrier's customer. These decisions in most cases requires some form of communication between the carrier's employee responsible for the customer contact, e.g a customer service representative or a salesperson, and the carrier's employee that is responsible for the balanced freight network of a geographic area, e.g. a load planner or a dispatcher.

The inventor has observed that previous methods of calculating load data and managing load capacity have significant limitations. A planner/dispatcher must use a significant amount of time to utilize their dispatch operating system to count, or rely on a previous count of, the available trucks and available loads whenever a customer requests a load booking decision. Those counts are typically generated on a periodic basis to flow the information to the executive, sales, and operation teams. Because of the real-time nature and always changing driver and order availability, the capacity balance counts are quickly outdated, inaccurate, and of no use for real-time load booking decisions by the customer service representative.

SUMMARY OF THE INVENTION

Wherefore, it is an object of the present invention to overcome the above mentioned shortcomings and drawbacks associated with the prior art.

Another object of the present invention is to provide real time network capacity and balance information to a carrier within the transportation industry by the use of a computer geographical map display via a computer system. The real time is interpreted to mean updates of preferably less than 15 minute interval updates, more preferably less than 5 minute updates, and most preferably less than or equal to 5 second updates.

A further object of the present invention is to maintain a database of the network capacity and balance information, specific to the carrier, which contains calculations that are for the available driver/truck capacity, the available load capacity, and the difference (or balance) between the two calculations. The driver/truck capacity can be determined by a combination of inputs from the carrier that include historical dispatch activity, current dispatch activity, and projected dispatch activity. The load capacity can be determined by a combination of inputs from the carrier that include the miles between origin and destination, the number of log hours required to complete the miles from origin to destination, the number of available log hours of a specific or standard driver, and the number of hours that the carrier has historically taken to travel the route between origin and destination.

Yet another object of the present invention is to determine an optimal date and time driver of a truck should arrive at the pick-up location of the load in order to make on-time service to the delivery location with the most optimal use of the driver's availability A still further object of the present invention is to display real time network capacity and load balance information to allow greater accuracy in determination of load booking decisions.

The advantages to this method of an efficient process of communicating the real-time capacity balance needs of the carrier include: (1) Internal daily work flow between the customer service representative and the planner/dispatcher is streamlined with fewer interactions needed to make real-time load booking decisions, (2) External customer satisfaction when a load booking decision happens within seconds and not minutes, (3) Internal daily work flow between the sales managers and the operation managers is more efficient with "self-serve" access to capacity balance needs. (4) Insight into the entire network's capacity balance activity allows sales managers to understand their current and future balance needs. (5) Insight into the entire network's capacity balance activity allows sales managers and executives to make better company decisions on marketing efforts in the geographical areas that the carrier services.

The following definitions apply to terms used in this disclosure:

Carrier—A company involved in the transport of the products of a customer from one location to another.

Customer—A company using the transport services of a carrier to move products from one location to another.

Driver—An agent or employee of the carrier that operates the truck used in performing the task of moving a load from one location to another.

Load—A set of customer products designated to be moved from one location to another.

Truck—The vehicle, typically a tractor/trailer, operated by the driver of the carrier. As used in this disclosure, the term truck may also refer to a driver and truck together.

Inbound Truck Capacity—The carrier's number of trucks that are available, or projected to be available, for transporting loads.

Outbound Load Capacity—The carrier's number of loads that are booked, or projected to be booked, by the carrier.

Booked Load—A load from a customer, accepted by the carrier, to be transported by the carrier.

Projected Load—A load not yet offered to the carrier from the customer, but has a reasonable expectation by the carrier to be booked.

Planned Load—A booked load that has a truck assigned to haul the load, but has not yet been dispatched to pick up the load.

Dispatch—Specific instructions given to a driver of a truck to transport a load.

Available Truck—A carrier's truck with a driver that has available driving hours remaining in his/her log book.

Projected Truck—A truck that is not yet dispatched, but has a reasonable expectation by the carrier to be dispatched and deliver the load to the destination.

Projected Time of Availability (PTA)—The date and time that a driver of a truck is available to pick up the next load.

Projected Hours of Service (PHOS)—The number of on-duty driving hours available for the driver at the driver's PTA.

Driver Log Book—A document or system maintained by the carrier or the driver that records the on-duty and off-duty activity of the driver that is to be in compliance with federal and/or state regulations. The log book data is preferably transmitted wirelessly from the truck to the carrier's server. The log book can be manually imputed by the driver or automatically determined via a GPS system in the truck. The log book preferably automatically updates at regular intervals, e.g., every 5 minutes or less, with change in location and driving time and automatically transmits such updates to the carrier server.

Load Booking Decision—A decision made by the carrier to accept or to not accept a load offer from a customer.

Defined Geographic Area—A joined set of geographic points or boundaries, like addresses, zip codes, postal codes, counties, provinces, or states. The carrier may use a standard or a custom geographical definition for areas. For example, the geographical area of "Dallas" may include just the Dallas city limit, the Dallas county limit, the Dallas-Fort Worth-Arlington, Tex. Metropolitan Statistical Area, or all areas within 100 miles of Dallas city center.

Balanced Freight Network—A defined geographic area, or grouping of areas, with the same number of inbound truck capacity and outbound load capacity.

Capacity Balance Needs/Network Capacity Balance—The difference between the number of inbound truck capacity and the number of outbound load capacity.

Driver Turnover—The measurement of drivers leaving the employment of the carrier to the current number of employed drivers of the carrier.

Unused Asset—An asset of the carrier that is available for production, but not used for production.

Repositioning—The carrier's unpaid, empty movement of a driver of a truck from one area to another area.

Business Segment—A segment of the carrier's operations that has some distinguishing type of service offering to the customer (e.g. dry van trailers, tanker trailers, etc.) or common driver distinction (e.g. driver pay, driver home location, etc.).

Load Earliest Pick-up Date and Time—The date and time that is the earliest time the load is available for pick-up by the carrier's driver.

Load Latest Pick-up Date and Time—The date and time that is the latest time the load is available for pick-up by the carrier's driver.

Load Ship Date and Time—The date and time designated by the customer, within the load pick-up window (the time between load earliest pick-up date and time and the load latest pick-up date and time), as a requested time to pick-up the load.

Pick-up Service Date and Time—The result of the algorithm that calculates the date and time the driver of a truck should arrive at the pick-up location of the load in order to make on-time service to the delivery location with the most optimal use of the driver's availability.

Load Earliest Delivery Date and Time—The date and time that is the earliest time the load is available for delivery by the carrier's driver.

Load Latest Delivery Date and Time—The date and time that is the latest time the load is available for delivery by the carrier's driver.

Delivery Service Date and Time—The result of the algorithm that calculates the date and time the driver of a truck should arrive at the delivery location of the load in order to make on-time service to the delivery location with the most optimal use of the driver's availability.

Capacity Balance Thresholds—A numeric range used to group the capacity balance needs of a defined geographic area for the purpose of reporting and displaying values on a map. This may vary depending on the carrier. For example, a carrier with a 100 trucks may desire a threshold of 5 trucks above and below zero in a given defined geographical area. Conversely, a carrier with 2,000 trucks may desired thresholds in the range of 100 above and below zero in a given defined geographical area.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
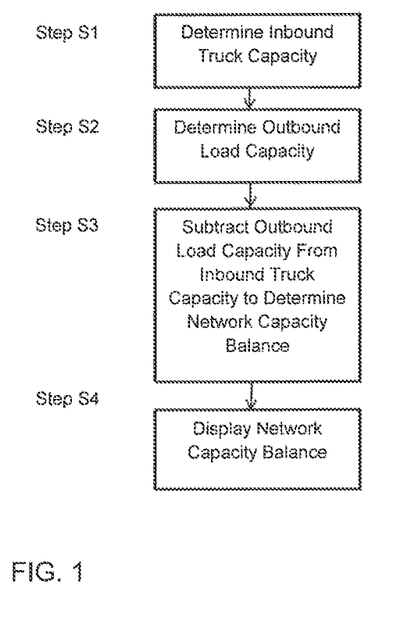
FIG. 1 is a schematic diagram of the steps of determining the network capacity balance according to the disclosed invention.

Turning now to FIG. 1, a brief description concerning the various components of the present invention will now be briefly discussed. As can be seen in this embodiment, in a first step S1 the inbound truck capacity is determined. In a second step S2, the outbound load capacity is determined. In a third step S3, the network balance is determined as the difference between the inbound truck capacity and outbound load capacity. In a fourth step S4, the network capacity balance is displayed.

The disclosed method calculates the capacity balance needs of each defined geographic area and displays the results of those calculations onto a map that is accessible from any web-enabled device with a database refreshed at least every 15 minutes.

According to one embodiment, the database used in the method utilizes the following truck/driver information in the calculation of inbound truck capacity: unique driver identifier, like an employee number; unique truck identifier, like a truck number; truck business segment; driver home location; truck last known satellite position location; truck last known satellite position time stamp; driver current destination location; driver current destination projected time of availability; and driver current destination projected hours of service.

TABLE 1

Truck/driver example detail input from the carrier
for calculating Inbound Truck Capacity
(Note: the "*" symbol is used to
denote "degrees" in Table 1 below).

| | |
|---|---|
| Driver identifier | EN0001 |
| Truck identifier | T111 |
| Truck business segment | OTR |
| Driver home location | Shreveport, LA |
| Truck last known satellite position location | 32*33'07"N, 93*41'41"W |
| Truck last known satellite position time stamp | Apr. 20, 2014 11:06 AM |
| Driver current destination location | Colorado Springs, CO |
| Driver current destination projected time of availability | Apr. 22, 2014 9:00 AM |
| Driver current destination projected hours of service | 7 |

According to one embodiment, the database used in the method utilizes the following load information in the calculation of the outbound load capacity: unique load identifier, like a load number, an order number, or a bill of lading number; load business segment; load customer; load origin location; load destination location; load earliest pick up date and time; load latest pickup date and time; load ship date and time; load earliest delivery date and time; load latest delivery date and time; and the load miles from origin to destination.

TABLE 2

Load detail example input from the carrier for calculating
Outbound Load Capacity

| | |
|---|---|
| Load identifier | A123456 - 01 |
| Load business segment | OTR |
| Load customer | RVC Services |
| Load origin location | Bossier City, LA |
| Load destination location | Colorado Springs CO |
| Load earliest pick up date and time | Apr. 19, 2014 8:00 AM |
| Load latest pickup date and time | Apr. 19, 2014 5:00 PM |
| Load ship date and time | Apr. 19, 2014 5:00 PM |
| Load earliest delivery date and time | Apr. 22, 2014 7:00 AM |
| Load latest delivery date and time | Apr. 23, 2014 10:00 PM |
| Load miles from origin to destination | 906 |

The database used in the method utilizes the following historical completed load information in the calculation of the projected load capacity: unique load identifier, business segment, customer, origin location, and the actual pick up date and time.

The database used in the method utilizes the following historical completed load information in the calculation of the projected truck capacity: unique load identifier, business segment, customer, destination location, and the actual delivery date and time.

TABLE 3

Historical load detail example input from the carrier for
calculating Projected Inbound Truck Capacity and
Projected Outbound Load Capacity

| | |
|---|---|
| Load identifier | A123000 - 01 |
| Load business segment | OTR |
| Load customer | MGX Manufacturing |
| Load origin location | Bossier City, LA |
| Load actual pick up date and time. | Apr. 10, 2014 9:23 AM |
| Load destination location | Chandler, AZ |
| Load actual delivery date and time. | Apr. 12, 2014 11:41 AM |

Inbound truck capacity preferably has a specific date and time associated with each truck, available and projected, in the truck capacity count. The specific date and time for each available truck is the projected time of availability for the truck. The specific date and time for each projected truck is from the historical completed load information's actual delivery date and time by day of week. The projected truck method is a calculation of the historical customer deliveries into a defined geographic area by day of week. If a customer has not booked loads for a given day of week, then the projected truck count for the defined geographic area will include the customer's historical volume by day of week based on the historical loads' actual delivery date and time.

Outbound load capacity preferably has a specific date and time associated with each load, available and projected, in the load capacity count. The specific date and time for each available load can be based on the load earliest pick-up date and time, the load latest pick-up date and time, the load ship date and time, or the pick-up service date and time. The specific date and time for each projected load is from the historical completed load information's actual pick-up date and time by day of week. The projected load method is a calculation of the historical customer pick-ups from a defined geographic area by day of week. If a customer has not booked loads for a given day of week, then the projected load count for the defined geographic area will include the customer's historical volume by day of week based on the historical loads' actual pick-up date and time.

The pick-up service date and time for the available load employs a unique method that determines the optimal date and time to pick up the load that fulfills the customer's requirement of on-time service and the carrier's best use of the driver's available driving hours. Example variables of the formula are outlined below:

Pick-Up Service Date a d Time Formula Variables:
- dh=Driving hours from origin to destination. This variable can be derived from the miles between origin and destination and the miles per hour that can be achieved from the origin to destination. (e.g. 450 miles at 45 miles per hour is 10 driving hours)
- dh24=Driving hours per 24 hour period. This variable can be derived from the number of drivers and the legal number of driving hours of the driver(s) in a 24 hour period. Federal restrictions currently limit a driver to 11 driving hours per 24 hour period.
- ndh24=Non-driving hours per 24 hour period. This variable can also be derived from the number of drivers and the legal number of driving hours of the driver(s) in a 24 hour period. Federal restrictions currently limit a driver to 11 driving hours per 24 hour period, so the number of non-driving hours per 24 hour period is 13.
- adh=Minimum driving hours adjusted for non-driving periods. This is a calculation that uses the variables dh, dh24, and ndh24.
- ardh=Minimum remaining driving hours after the last non-driving period. This is a calculation that uses the variables dh and dh24.
- irdh=Initial remaining driving hours available at Projected Time of Availability (PTA). This variable can be an assumed standard number of remaining driving hours available at PTA for the carrier, a historical number of hours based on the destination location, or specific driver input from the carrier if the remaining driving hours is known.
- calcoffset=Calculated offset hours for on-time service. This is a calculation that uses the variable irdh and previous calculations of adh and ardh.
- lddt=Latest delivery date and time. This variable is data input from the carrier specific to the load.
- odkh=Origin dock hours. This variable can be an assumed standard number of hours for the carrier; or an assumed standard number of hours for the type of pick-up, like a pre-loaded trailer that is ready prior to the arrival of the driver or a live-load trailer that requires the driver to wait for the trailer to the loaded; or a historical number of hours based on actual amount of hours the carrier's drivers have spent at the origin pick-up.
- tzd=Time zone difference from origin to destination. This variable is the difference in number of hours of the time zone of the origin and the time zone of the destination from the data input from the carrier specific to the load.
- opusdt=Optimal pick-up service date and time. This is a calculation that uses the variables lddt, odkh, and tzd; and previous the calculation of calcoffset.
- epdt=Earliest pick-up date and time. This variable is data input from the carrier specific to the load.
- lpdt=Latest pick-up date and time. This variable is data input from the carrier specific to the load.
- psdt=Pick-up service date and time. This is the ultimate calculation that uses the variables epdt and lpdt; and previous the calculation of opusdt.

Derivation of Variables

The following is an exemplary embodiment for deriving the ADH, ARDH, CALCOFFSET, OPUSDT, and PSDT.

ADH The minimum driving hours adjusted for non-driving periods is equal to the product of the driving hours from origin to destination times the non-driving hours per twenty four hour period if the sum of negative one plus the integer portion of the quotient of driving hours from origin to destination divided by the driving hours per twenty four hour period is equal to zero. If not, the minimum driving hours adjusted for non-driving periods is equal to the driving hours from origin to destination plus the product of the non-driving hours per twenty four hour period times the integer portion of the quotient of the driving hours from origin to destination divided by the driving hours per twenty four hour period. In alternate variations of this variable, the minimum driving hours adjusted for non-driving periods would just be equal to the driving hours from origin to destination plus the product of the non-driving hours per twenty four hour period times the integer portion of the quotient of the driving hours from origin to destination divided by the driving hours per twenty four hour period. In a further variation, the full quotient of the driving hours from origin to destination divided by the driving hours per twenty four hour period may be used, and not just the integer portion.

In C# language, ADH can be represented as:

$$adh=dh\ ndh24*[dh/dh24]-1)==0?1:[dh\ dh24]))$$

or, alternately $$adh=dh+(ndh24*[dh/dh24])$$

ARDH The minimum remaining driving hours after the last non-driving period is equal to the remainder of the quotient of dividing the driving hours from origin to destination by the driving hours per twenty-four hour period. This operation is sometimes referred to as the modular, and can be limited to integer division in some computer languages, and the integer remainder from the division (e.g., 26% 11=4), though such is not necessary for the invention.

In C# language, ARDH can be represented as:

$$ardh=[dh\ \%\ dh24]$$

CALCOFFSET The calculated offset hours for on-time service is equal to three hours less than the minimum remaining driving hours adjusted for non-driving periods if the minimum remaining driving hours after the last non-driving period is less than the initial remaining driving hours available after the projected time of availability. If not, the calculated offset hours for on-time service is equal to the ten hours more than the minimum remaining driving hours adjusted for non-driving periods. The 3 in the "adh−3" and the 10 in the "adh+10" could change if the legal allowable driving hours changes.

In C# language, CALCOFFSET can be represented as:

$$calcoffset=irdh>=ardh?adh-3:adh+10$$

OPUSDT The optimal pick-up service date and time is equal to latest delivery date and time minus the product of one-twenty-fourth and the sum of the calculated offset hours for on-time service, plus the origin dock hours, plus the time zone difference from origin to destination. The optimal pick-up service date and time is expressed as a whole number for the date and fractional $1/24^{ths}$ for the hour. Therefore, by example, March 2 10:00 minus $20/24^{ths}$ would equal March 1 14:00.

In C# language, OPUSDT can be represented as:

$$opusdt=lddt-((calcoffset/24m)+(odkh/24m)+(tzd/24m))$$

PSDT The pick-up service date and time is equal to the earliest pick-up date and time if the optimal pick-up service date and time is before the earliest pick-up date and time. If not, the pick-up service date and time is equal to the earlier of the latest pick-up date and time and the optimal pick-up service date and time In C# language, the Pick-Up Service Date and Time can be represented as:

psdt=opusdt<=epdt?epdt:opusdt>=1pdt?lpdt:opusdt

In an expanded form, the Pick-Up Service Date and Time Formula can be represented as:

psdt=(lddt(((irdh>=([dh % dh24])?(dh+(ndh24*(([dh/
        dh24])-1)==0?1:([dh/dh24])))-3:(dh+(ndh24*
        (([dh/dh24])-1)==0?1:([dh/dh24])))+10)/24m)+
        (odkh/24m)+(tzd/24m)))<=epdt?epdt(lddt
        (((irdh>=([dh % dh24])?(dh+(ndh24(([dh/
        dh24])-1)==0?1:([dh/dh24])))-3:(dh+(ndh24*
        (([dh/dh24])-1)==0?1:([dh dh24])))+10)/24)+
        (odkh/24)+(tzd/24)))>=1pdt?lpdt:(lddt(((irdh>=
        ([dh % dh24])?(dh(ndh24*(([dh dh24])-1)
        ==0?1:([dh/dh24])))-3:(dh(ndh24(([dh dh24])-
        1)==0?1:([dh/dh24])))+10)/24)+(odkh/24)+(tzd/
        24)))

The above variables and formula are just example embodiment of the disclosed invention.

Example 1: Pick-Up Service Date and Time Formula

Load from Shreveport, La. to Memphis, Tenn. is 346 miles. The load is available to pick up between March 1 at 08:00 and March 2 at 06:00. The load must deliver no later than March 2 at 10:00. A driver with 7 available driving hours at his/her PTA will be assigned to pick up and deliver the load.

Pick-Up Service Date and Time Formula Variables for Example 1:
  dh=8; Driving hours
  dh24=11; Driving hours per 24 hour period
  ndh24=13; Non-driving hours per 24 hour period
  adh=Minimum driving hours adjusted for non-driving periods
  ardh=Minimum remaining driving hours after the last non-driving period
  irdh=7; Initial remaining driving hours available at PTA
  calcoffset=Calculated offset hours for on-time service
  lddt=March 2 10:00; Latest delivery date and time
  odkh=2 Origin dock hours
  tzd=0; Time zone difference from origin to destination
  opusdt=Optimal pick-up service date and time
  epdt=March 1 08:00; Earliest pick-up date and time
  lpdt=March 2 06:00; Latest pick-up date and time
  psdt=Pick-up service date and time
Pick-Up Service Date and Time Formula in Parts for Example 1:
  adh=8+(13*(([8/11]-1)==0?1: [8/11])) result is 8
  ardh=[8% 11] result's 8
  calcoffset=7>=8?8-3:8+10 result is 16
  opusdt=March 2 10:00-((18/24m)+(2/24m)+(0/24m)) result is March 1 14:00
  psdt=March 1 14:00<=March 1 08:00 ? March 1 08:00: March 1 14:00>=March 2 06:00 ? March 2 06:00: March 1 14:00 result is March 1 14:00

Example 2: Pick-Up Service Date and Time Formula

Load from Memphis, Tenn. to Chandler, Ariz. is 1,419 miles. The load is available to pick up between March 1 at 08:00 and March 2 at 20:00. The load must deliver no later than March 4 at 15:00. A driver with 4 available driving hours at his/her PTA will be assigned to pick up and deliver the load.

Pick-Up Service Date and Time Formula Variables for Example 2:
  dh=32 Driving hours
  dh24=11; Driving hours per 24 hour period
  ndh24=13; Non-driving hours per 24 hour period
  adh=Minimum driving hours adjusted for non-driving periods
  ardh=Minimum remaining driving hours after the last non-driving period
  irdh=4; Initial remaining driving hours available at PTA
  calcoffset=Calculated offset hours for on-time service
  lddt=March 4 15:00; Latest delivery date and time
  odkh=1; Origin dock hours
  tzd=-2; Time zone difference from origin to destination
  opusdt=Optimal pick-up service date and time
  epdt=March 1 08:00; Earliest pick-up date and time
  lpdt=Marc 2 24:00; Latest pick-up date and time
  psdt=Pick-up service date and time
Pick-Up Service Date and Time Formula in Parts for Example 2:
  adh=32+(13*(([32/11]-1)==0?1: [32/11])) result is 58
  ardh=[32% 11] result is 10
  calcoffset=4>=10? 58-3:58+10 result is 68
  opusdt=March 4 15:00-((68/24m)+(1/24m)+(-2/24m)) result is March 1 20:00
  psdt=March 1 20:00<=March 1 08:00 ? March 1 08:00: March 1 20:00>=March 2 20:00 ? March 2 20:00: March 1 20:00 result is March 1 20:00

An inventive process based upon the novel PSDT is for the carrier to determine the PSDT for a load, and then the carrier's truck to arrive at the customer's load location at the PSDT, The carrier's truck would then load and deliver the customer's load.

Figure 2:
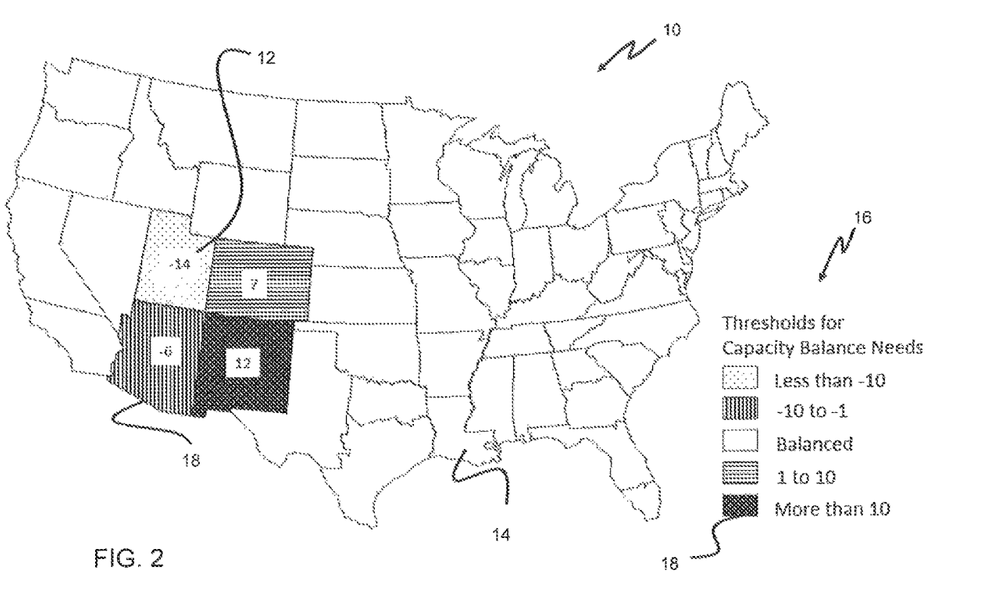
FIG. 2 is a display of a first network capacity balance according to the method of FIG. 1.

As shown in FIG. 2, the computer system displays on a map 10 the calculated inbound truck capacity (available and projected), inbound load capacity (available and projected), and balance 12 (difference between the inbound truck capacity and the outbound load capacity) based on the defined geographic areas 14. The balance by area is grouped into varying degrees of capacity balance thresholds 16. Those different groupings assigned a pattern or color 18 and displayed on the map 10. The map 10 displays the defined geographical areas 14 shaded with the pattern or color 18 associated with the capacity balance threshold 16 grouping. For instance, a defined geographical area 14 of Colorado is calculated to have an inbound truck capacity of 25 and an outbound load capacity of 18 for a given date and time range. The resulting capacity balance 12 need is 7. A grouping of capacity balance thresholds 16 has a lower threshold of 1 and an upper threshold of 10 that is assigned the pattern 18 of horizontal stripes. The map 10 would display the defined geographical area 14 of Colorado the pattern of horizontal stripes 18.

Based on the information displayed in FIG. 2, there are several different decisions that can be made by the carrier's employees. The carrier can quickly see that they need to book additional outbound load capacity out of Colorado to match up with the inbound truck capacity. The carrier can also quickly see that the carrier has significantly more outbound load capacity out of Utah than inbound truck capacity, so the carrier needs to refrain from booking any additional loads out of that area. The carrier would also recognize that the outbound load capacity that has already been booked out of Utah is in jeopardy of service issues due to being overbooked (more outbound load capacity and inbound truck capacity) or that the carrier would have to incur significant repositioning costs to move excess inbound truck capacity from another area, like Colorado or New Mexico, into Utah.

From this map display 10 in FIG. 2, a hypothetical decision is made by the operations managers of a carrier to reposition 7 of excess truck capacity in Colorado to Utah, a customer service representative booked 15 additional loads out New Mexico with 6 of the 15 delivering into Arizona. Now there is new data input from the carrier, the calculations for inbound truck capacity and outbound load capacity would result in an updated balance 12 and an updated map display 10 of the information, as shown in FIG. 3

Figure 3:
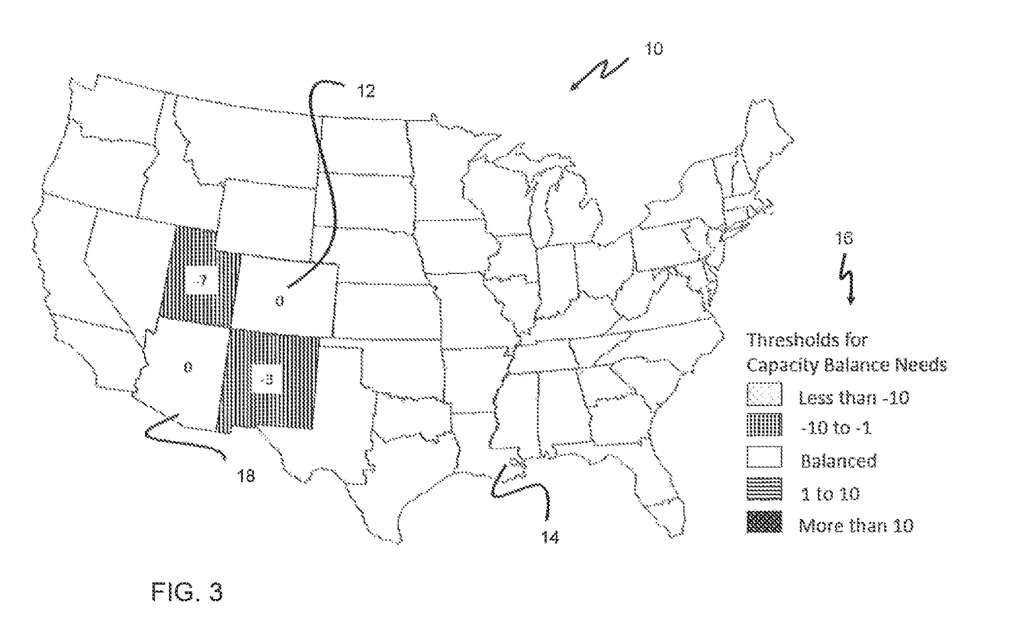
FIG. 3 is a display of a second network capacity balance according to the method of FIG. 1.

In FIG. 3, a map 10 of the capacity balance needs 12 is shown after a 5 minute time lapse from FIG. 2, during which such time changes have occurred.

Based on the information displayed in the map 10 of FIG. 3, there are now several different decisions that can be made by the carrier's employees. New Mexico has gone from needing additional outbound load capacity to needing additional inbound truck capacity. Colorado has become balanced with the repositioning of truck capacity to Utah, Utah needs less inbound truck capacity than it did, and Arizona has become balanced with the additional inbound truck capacity from the recent loads booked from New Mexico into Arizona.

It is anticipated that network balance 12 is, determined on a carrier computer via a balance and visualization module, with data necessary for such determination being generated, received, and/or stored on the carrier computer. In an alternative embodiment, the network balance may be determined on a third-party's computer via a balance and visualization module, with the data necessary for such determination being generated, received, and/or stored on the third party computer, and the network balance transmitted from the third-party computer to the carrier computer, via the Internet. In yet a further embodiment, the network balance 12 determination and a balance and visualization module may be split between the carrier computer and the third-party computer.

Figure 4:
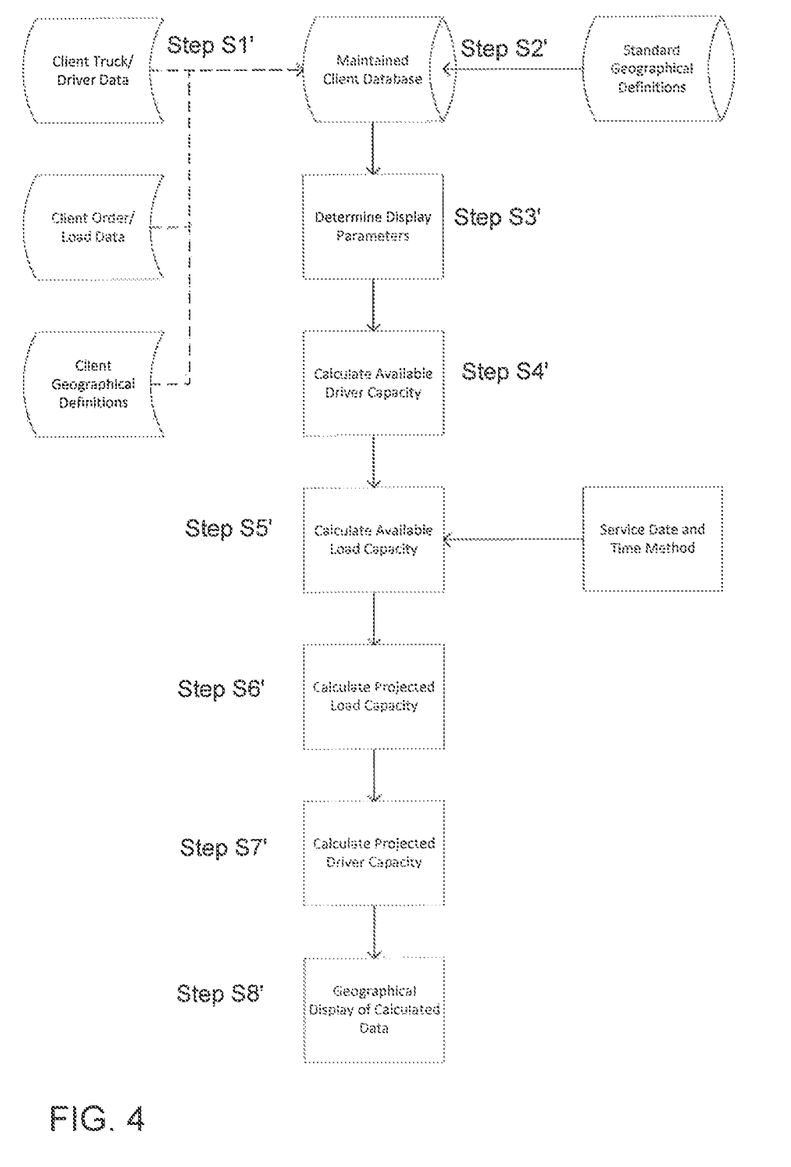
FIG. 4 is a schematic diagram of steps of determining network capacity balance according to a second embodiment of the disclosed invention.

Turning now to FIG. 4, an additional embodiment for the disclosed method and system is shown. In this embodiment, in step St client (carrier) truck/driver data, client (carrier) order/load data, and client (carrier) geographical definitions (which may be different from the standard geographical definitions) are entered into the client (carrier) database. In step S2' the standard geographical definitions are entered into the maintained client (carrier) database. In step S3', the display parameters are selected/determined. In step S4', the available driver capacity is calculated, In step S5', the available load capacity is calculated. In this embodiment, the available load capacity is based on the service date and time method. In step S6', the projected load capacity is calculated. In step S7', the projected driver capacity is calculated. In step S8' the calculated data is displayed in a geographical format such as a map.

In further embodiments of the disclosed method and system, additional variables would be used to more accurately determine inbound truck capacity and outbound load capacity. Such additional variables include current and predicted weather that could impact traveling and loading/unloading times, traffic conditions, road construction conditions, vehicle mechanical conditions, vehicle fuel levels, and driver specific variables (e.g., percent on-time, average speed above/below the speed limit, etc.).

In additional further embodiments, the network balance may be displayed in tables showing total number and percent of balanced defined geographical areas for the carrier, total number of inbound trucks and outbound loads for all geographical areas, five or so most overbooked defined geographical areas with number of inbound trucks, outbound loads, and balance for each, five or so most underbooked defined geographical areas with number of inbound trucks, outbound loads, and balance for each. The network balance may be displayed for a current day, a 24 hour period from a current time, a next day, a third day, a fourth day, or a user defined date range. The carrier may choose to "hold" or direct the computer not count loads in the network balance meeting with certain criteria, including loads where a customer indicates that an order is not ready for pick up yet, orders that are local/city loads, orders that are to be transported less than, for example, 50 miles, or trucks with a delivery time of 11:59 pm. The network balance may be displayed depending on loads by customer origin, planned loads and trucks, trucks by PTA location, trucks by home location, trucks by projected inbound, and trucks by last known location.

Additionally, to aid in visualization, on a network balance, multiple concentric maps of availability from a selected area may be displayed, with each larger concentric map displaying a later time period. That is, each concentric map may show network balances for defined geographical areas within the concentric map for a given day drive time from a selected area. For example, 0-600 miles from the selected area being in the innermost circle and displaying network balances for current day, 601-1,200 miles from selected area in a larger circle area/annulus displaying network balances for a next or second day, and 1,201-1,800 miles from selected area in an even larger circle area/annulus displaying network balances for a third day.

Figure 5:
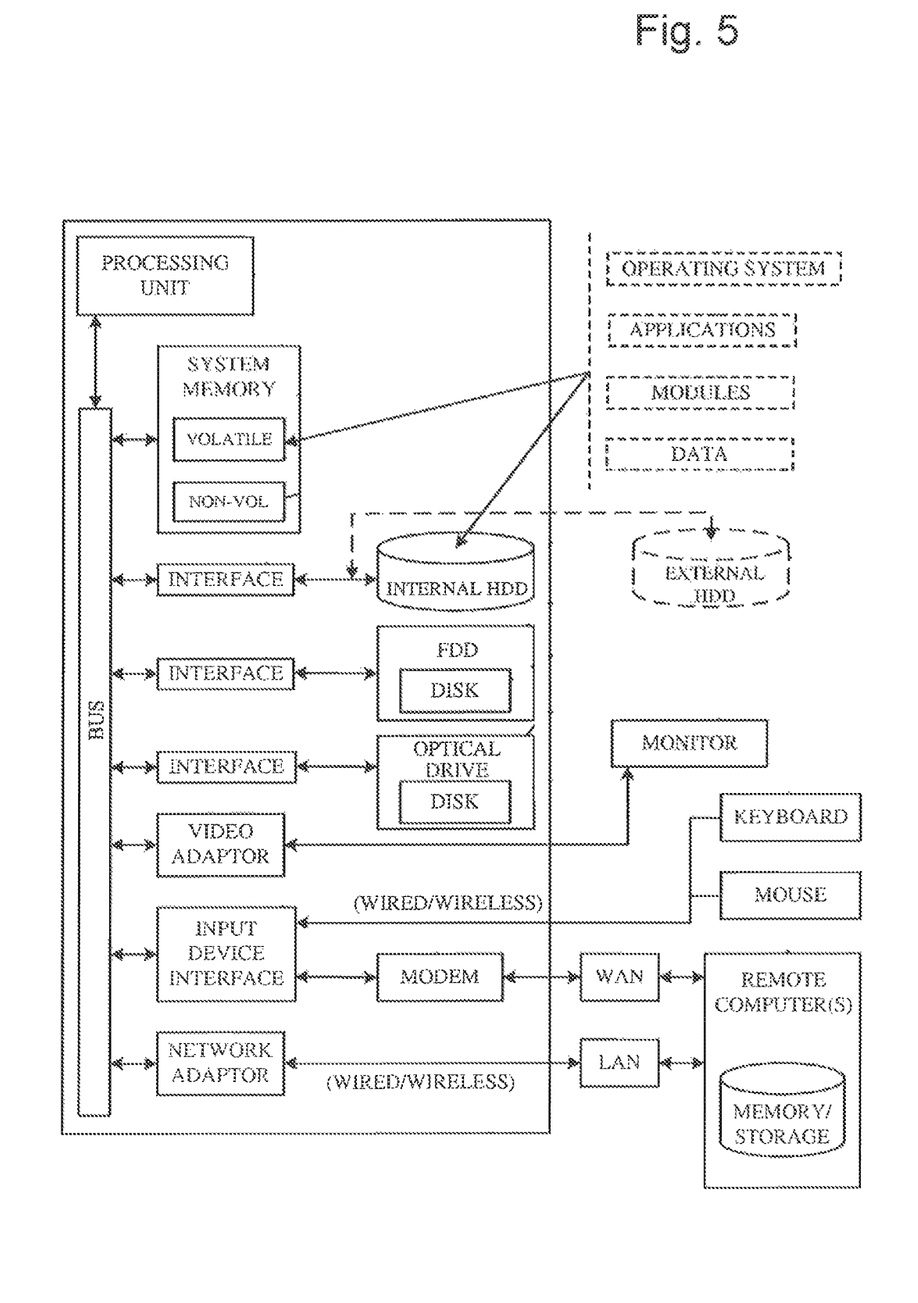
FIG. 5 is an exemplary schematic diagram of a system to for performing the method of FIG. 1.

Turning to FIG. 5, as used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of, e.g., optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring now to FIG. 5, there is illustrated a block diagram of a computing system operable to execute the disclosed balancing and visualization modules in accordance with the disclosed architecture. In order to provide additional context for various aspects thereof, FIG. 5 and the following discussion are intended to provide a brief, general description of a suitable computing system in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, such as video/photo enabled "smart phones", microprocessor-based or programmable consumer electronics, and the like, each of which can be operatively coupled to one or more associated devices.

In this description, the term "module" refers to computational logic for providing the specified functionality. A module can be implemented in hardware, firmware, and/or software. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices, loaded into memory, and executed by the one or more processors. It will also be appreciated that the operations of the balancing and visualization modules require computer implemented elements (e.g., memory, processor, etc.) and cannot be performed by the human mind as mere mental steps.

The illustrated aspects can also be practiced in distributed computing environments where certain tasks are performed by remote processing devices that are linked through a communications network. In a distributed computing environment, program modules can be located in both local and remote memory storage devices.

The computer will typically include a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 5, the exemplary computing system for implementing various aspects of the method and system includes a computer having a processing unit, a system memory and a system bus. This computer can be representative of the carrier computer, the customer computer, the carrier server, a third-party computer and/or a third-party server. The system bus provides an interface for system components including, but not limited to, the system memory to the processing unit. The processing unit can be any of various commercially available processors. Dual microprocessors and other multi-processor architectures may also be employed as the processing unit.

The system bus can be any of several types of bus structure that may further interconnect to a memory bus (with or without a memory controller), a peripheral bus, and a local bus using any of a variety of commercially available bus architectures. The system memory can include non-volatile memory (NON-VOL) and/or volatile memory (e.g., random access memory (RAM)). A basic input/output system (BIOS) can be stored in the non-volatile memory (e.g., ROM, EPROM, EEPROM, etc.), which BIOS are the basic routines that help to transfer information between elements within the computer, such as during start-up. The volatile memory can also include a high-speed RAM such as static RAM for caching data.

The computer further preferably includes an internal hard disk drive (HDD) (e.g., EIDE, SATA), which internal HOD may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as a DVD). The HOD, FDD and optical disk drive can be connected to the system bus by a HOD interface, an FDD interface and an optical drive interface, respectively. The HDD interface for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory, including an operating system, one or more application programs, other program modules, and program data. The one or more application programs, other program modules, and program data can include the balancing and visualization system.

All or portions of the operating system, applications, modules, and/or data can also be cached in the volatile memory.

A user can enter commands and information into the computer through one or more wire/wireless input devices, for example, a keyboard and a pointing device, such as a mouse. Other input devices (not shown) may include a microphone, an IR remote control, a joystick, a game pad, a stylus pen, touch screen, or the like. These and other input devices are often connected to the processing unit through an input device interface that is coupled to the system bus, but can be connected by other interfaces such as a parallel port, IEEE 1394 serial port, a game port, a USB port, an IR interface, etc. A monitor or other type of display device is also connected to the system bus via an interface, such as a video adaptor. In addition to the monitor, a computer typically includes other peripheral output devices (not shown), such as speakers, printers, etc. The output of the balancing and visualization module is preferably the monitor or other type of display device.

The computer may operate in a networked environment using logical connections via wire and/or wireless communications to one or more remote computers, such as a remote computer(s). The remote computer(s) can be a workstation, a server computer, a router, a personal computer, portable computer, microprocessor-based entertainment appliance, a peer device or other common network node, and typically includes many or all of the elements described relative to the computer, although, for purposes of brevity, only a memory/storage device is illustrated. The logical connections depicted include wire/wireless connectivity to a local area network (LAN) and/or larger networks, for example, a wide area network (WAN). Such LAN and WAN networking environments are commonplace in offices and companies, and facilitate enterprise-wide computer networks, such as intranets, all of which may connect to a global communications network, for example, the Internet.

When used in a LAN networking environment, the computer is connected to the LAN through a wire and/or wireless communication network interface or adaptor. The adaptor can facilitate wire and/or wireless communications to the LAN, which may also include a wireless access point disposed thereon for communicating with the wireless functionality of the adaptor.

When used in a WAN networking environment, the computer can include a modem, or is connected to a communications server on the WAN, or has other means for establishing communications over the WAN, such as by way of the Internet. The modem, which can be internal or external and a wire and/or wireless device, is connected to the system bus via the input device interface. In a networked environment, program modules depicted relative to the computer, or portions thereof, can be stored in the remote memory/storage device. It will be appreciated that the network connections shown are exemplary and other means of establishing a communications link between the computers can be used.

The computer is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

This method may further comprise steps that help predict the availability of trucks and if the driver's claimed availability is accurate, or if it needs to be flagged or discounted. For example, the driver's history of claims could be examined for past accuracy, and the current availability could be discounted or bumped up based on past history. The driver's truck could transmit mechanical data warning of imminent breakdown that or current breakdown, the driver's truck can transmit data relating to fuel or other fluid refill that may/must need to be completed before the driver reaches his destination. Road construction and traffic flow (traffic jams/accidents) data can be monitored by the system and used to determine if the driver will be able to reach a destination in the amount of time predicted. Indeed all of these data could be used together or alone to better predict the availability of the driver.

The method may also comprise steps that allow more accurate real time availability. This includes automatically transmitting logging data wirelessly from the truck to the carriers, either through a logging program on the truck, or by tracking GPS signals from the truck and interpreting an initial change in the truck's location as a start time for a daily log.

The above examples, formulas, and embodiments are just exemplary of the disclosed invention, and or in no way limiting. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

I claim:

1. A computer-implemented carrier balancing and visualization system, comprising:
    at least one truck with a GPS system; and
    a carrier computer physically separate from the truck and having one or more processors and a memory coupled to the one or more processors, the memory storing instructions which, when executed by the one or more processors, cause the one or more processors to:
        input carrier truck/driver data into the carrier computer memory;
        input carrier order/load data into the carrier computer memory;
        input carrier geographical definitions data into the carrier computer memory;
        input standard geographical definitions data into the carrier computer memory;
        calculate an optimal pick-up service date and time based on at least a latest delivery date, an origin dock hours, the carrier truck/driver data and a calculated offset hours for on-time service,
        wherein the calculated offset hours for on-time service is equal to three hours less than a minimum remaining driving hours adjusted for non-driving periods when the minimum remaining driving hours after a last non-driving period is less than an initial remaining driving hours available after a projected time of availability;
        calculate available driver capacity based at least in part on a service date and time and the optimal pick-up service date and time;
        calculate projected load capacity;
        calculate projected driver capacity; and
        display calculated data in a geographical format, wherein the calculated data includes a network balance, the optimal pick up service date and time, the available driver capacity, the projected load capacity, and the projected driver capacity;

wherein:
the carrier truck/driver data includes geographical data automatically transmitted from the truck GPS system to the carrier computer,
the calculated data is transmitted back to the truck by the one or more processors, and
the truck is driven to a new location based on the calculated data transmitted back to the truck.

2. The system of claim 1, wherein the memory storing instructions which, when executed by the one or more processors, cause the one or more processors to display a network balance, further comprises the steps of
determining an inbound truck capacity,
determining an outbound load capacity, and
subtracting the inbound truck capacity form the outbound load capacity to determine the network balance.

3. The system of claim 2, wherein the memory storing instructions which, when executed by the one or more processors, cause the one or more processors to display a network balance, further comprises the steps of
limiting the determination of the inbound truck capacity to a specific geographical area, and
limiting the determination of the outbound capacity to the same specific geographical area.

4. The system of claim 2, wherein the memory storing instructions which, when executed by the one or more processors, cause the one or more processors to display a network balance, further comprises the steps of
determining the inbound truck capacity by
counting a number of trucks that are available or are projected to be available to carry a load and labeling such number a truck capacity count; and associating a specific date and time with loads in a load capacity count.

5. The system of claim 2, wherein the memory storing instructions which, when executed by the one or more processors, cause the one or more processors to display a network balance, further comprises the steps of
determining the outbound load capacity by
counting a number of loads that are booked or are to be booked and labeling such number a load capacity count; and
associating a specific date and time with loads in a load capacity count.

6. The system of claim 2, wherein the memory storing instructions which, when executed by the one or more processors, cause one or more processors to display a network balance, further comprises the step of limiting the determination of the outbound capacity to loads that have a date and time within a defined time span.

7. The system of claim 2, wherein the memory storing instructions which, when executed by the one or more processors, cause the one or more processors to display a network balance, further comprises the step of utilizing driver log book information in the determination of the network balance.

8. The system of claim 7, wherein the memory storing instructions which, when executed by the one or more processors, cause the one or more processors to display a network balance, further comprises the step of utilizing driver log book information transmitted from a truck via wireless transmission.

9. The system of claim 8, wherein the memory storing instructions which, when executed by the one or more processors, cause the one or more processors to display a network balance, further comprises the step of determining the network balance based on the transmitted log book information less than 15 minutes from a time of transmission of the log book information.

10. The system of claim 2, wherein the memory storing instructions which, when executed by the one or more processors, cause the one or more processors to display a network balance, further comprises the step of determining the inbound truck capacity based on one of historical dispatch activity, current dispatch activity, and projected dispatch activity.

11. The system of claim 2, wherein the memory storing instructions which, when executed by the one or more processors, cause the one or more processors to display a network balance, further comprises the step of determining outbound load capacity based on one of a number of miles between origin and destination, a number of log hours required to complete the miles from origin to destination, a number of available log hours of a specific or a standard driver, and a number of hours that a truck has historically taken to travel a route between origin and destination.

12. The system of claim 2, wherein the memory storing instructions which, when executed by the one or more processors, cause the one or more processors to display a network balance, further comprises the step of determining the outbound load capacity based on a pick-up service date and time.

13. The system of claim 12, wherein the memory storing instructions which, when executed by the one or more processors, cause the one or more processors to display a network balance, further comprises the step of basing the pick-up service date and time on an earliest pick-up date and time, the optimal pick-up service date and time, and a latest pick-up date and time.

14. The system of claim 13, wherein the memory storing instructions which, when executed by the one or more processors, cause the one or more processors to display a network balance, further comprises the step of further basing the optimal pick-up service date and time on a time zone difference from an origin to a destination.

15. The system of claim 14, wherein the memory storing instructions which, when executed by the one or more processors, cause the one or more processors to display a network balance, further comprises the step of further basing the calculated offset hours for on-time service on an initial remaining driving hours available after a projected time of availability.

16. The system of claim 15, wherein the memory storing instructions which, when executed by the one or more processors, cause the one or more processors to display a network balance, further comprises the step of basing the minimum remaining driving hours after the last non-driving period based on a driving hours from origin to destination and a driving hours per twenty-four hour period.

17. The system of claim 15, wherein the memory storing instructions which, when executed by the one or more processors, cause the one or more processors to display a network balance, further comprises the step of basing the minimum driving hours adjusted for non-driving periods on a driving hours from origin to destination, a non-driving hours per twenty four hour period and a driving hours per twenty four hour period.

18. The system of claim 15, wherein the memory storing instructions which, when executed by the one or more processors, cause the one or more processors to display a network balance, further comprises the step of determining the pick-up service date and time to be equal to an earliest pick-up date and time if an optimal pick-up service date and time is before the earliest pick-up date and time and
    determining the pick-up service date and time is equal to the earlier of the latest pick-up date and time and the optimal pick-up service date and time if the optimal pick-up service date and time is later than the earliest pick-up date and time.

19. The system of claim 2, wherein the memory storing instructions which, when executed by the one or more processors, cause the one or more processors to display a network balance, further comprises the step of automatically updating the displayed network balance based on load booking decisions made by the carrier.

20. The system of claim 15, wherein the memory storing instructions which, when executed by the one or more processors, cause the one or more processors to display a network balance, further comprises the steps of determining a pick-up service date and time of a load, before the truck arrives at a load site, based on each of the earliest pick-up date and time; and the carrier computer communicating to the truck, before the truck arrives at a load site, information for the truck to arrive at a load site to transport the load at the pick-up service date and time; and
    wherein the geographical format is displayed on a map on a screen of the carrier computer coupled to the computer processor.

\* \* \* \* \*